United States Patent
Scarpa et al.

(10) Patent No.: US 8,139,689 B2
(45) Date of Patent: Mar. 20, 2012

(54) HIERARCHICAL OFFSET COMPENSATION TO IMPROVE SYNCHRONIZATION AND PERFORMANCE

(75) Inventors: Carl Scarpa, Plainsboro, NJ (US); Edward Schell, Jackson, NJ (US)

(73) Assignee: Sirius XM Radio, Inc., New York, NY (US)

( * ) Notice: Subject to any disclaimer, the term of this patent is extended or adjusted under 35 U.S.C. 154(b) by 891 days.

(21) Appl. No.: 12/079,782

(22) Filed: Mar. 28, 2008

(65) Prior Publication Data

US 2009/0097592 A1    Apr. 16, 2009

Related U.S. Application Data

(60) Provisional application No. 60/920,920, filed on Mar. 29, 2007.

(51) Int. Cl.
*H03D 3/22* (2006.01)

(52) U.S. Cl. ........ 375/332; 375/316; 375/322; 375/329; 375/340; 375/347; 455/161.1; 455/164.2; 370/316

(58) Field of Classification Search .................. 375/259, 375/260, 261, 267, 297, 316, 329, 332, 342, 375/343, 350, 299, 306, 355
See application file for complete search history.

(56) References Cited

U.S. PATENT DOCUMENTS

| | | | | |
|---|---|---|---|---|
| 6,473,506 | B1 * | 10/2002 | Hook et al. | 379/279 |
| 7,751,472 | B2 * | 7/2010 | Watanabe | 375/240 |
| 7,826,521 | B1 * | 11/2010 | Sun et al. | 375/225 |
| 2005/0078778 | A1 * | 4/2005 | Chen | 375/346 |
| 2005/0129149 | A1 | 6/2005 | Kuntz | |
| 2006/0072679 | A1 * | 4/2006 | Chen et al. | 375/261 |
| 2006/0140310 | A1 | 6/2006 | Tashiro | 375/329 |
| 2007/0025283 | A1 * | 2/2007 | Koslov | 370/316 |
| 2007/0054614 | A1 * | 3/2007 | Walker et al. | 455/3.02 |
| 2009/0022234 | A1 * | 1/2009 | Wang et al. | 375/260 |

OTHER PUBLICATIONS

International Search Report and Written Opinion of the International Searching Authority, issued for corresponding PCT Application PCT/US06/61455, Nov. 20, 2007.

* cited by examiner

*Primary Examiner* — Hirdepal Singh
(74) *Attorney, Agent, or Firm* — Kramer Levin Naftalis & Frankel LLP

(57) ABSTRACT

Systems and methods for removing phase shifts due to hierarchical modulation to improve synchronization and performance in legacy and hierarchical decoders are presented. To compensate for the effects of hierarchical modulation, such methods include receiving an I,Q symbol that has been further modulated by an overlay phase shift, detecting the direction of the overlay phase shift, de-rotating the symbol by a defined angle corresponding to the overlay phase shift and said direction; and passing the symbol to legacy synchronization and forward error correction decoding stages after said de-rotating. An exemplary receiver can be provided to implement the disclosed methods.

13 Claims, 2 Drawing Sheets

HIERARCHICAL OFFSET COMPENSATION TO IMPROVE SYNCHRONIZATION AND PERFORMANCE

CROSS-REFERENCE TO OTHER APPLICATIONS

This application claims the benefit of and hereby incorporates by reference U.S. Provisional Patent Application No. 60/920,920, entitled "HIERARCHICAL OFFSET COMPENSATION TO IMPROVE SYNCHRONIZATION AND PERFORMANCE," filed on Mar. 29, 2007.

TECHNICAL FIELD

The present invention relates to satellite broadcast communications, and more particularly to systems and methods for removing offsets resulting from hierarchical modulation schemes to improve synchronization and performance in legacy and hierarchical decoders.

SUMMARY

Systems and methods for removing phase shifts due to hierarchical modulation to improve synchronization and performance in legacy and hierarchical decoders are presented. In exemplary embodiments of the present invention, methods of compensating for the effects of hierarchical modulation can, for example, comprise receiving an I,Q symbol that has been further modulated by an overlay phase shift, detecting the direction of the overlay phase shift, de-rotating the symbol by a defined angle corresponding to the overlay phase shift and said direction; and passing the symbol to legacy synchronization and forward error correction decoding stages after said de-rotating. An exemplary receiver can be provided to implement the disclosed methods. Exemplary embodiments of the present invention provide the simplest solution to compensating for overlay modulation without requiring modification of any proven algorithms within legacy demodulator designs. The methods of exemplary embodiments of the present invention allow for essentially any offset angle used in an overlay modulation scheme to have minimal effect on signal acquisition and performance.

DETAILED DESCRIPTION

The present invention can be applied to any system which utilizes hierarchical modulation to transmit secondary information. For example, the Sirius Satellite Digital Audio Radio System ("SDARS") contemplates using a second layer of modulation to transmit video data on top of its regular audio signal. In order to support such future services within the original system design (sometimes referred to herein as a "legacy" system), additional information bandwidth can be acquired, for example, by using hierarchical modulation to overlay data for such new services on top of the legacy transmission. In such a system, for example, overlay data can be transmitted by applying a programmable angular offset to legacy QPSK symbols, forming a new constellation similar to 8PSK, as is shown in FIG. 1.

For example, given a complex legacy symbol $L=L_i+j*L_q$, a transmitted overlay symbol O can be expressed as $O=(L_i+j*L_q)*(\cos\alpha \pm j*\sin\alpha)$, where the sign in the second component represents the value of the overlay bit and can thus determine, for example, the direction of rotation of the ultimately transmitted I,Q symbol relative to the original, or legacy, QPSK symbol.

Figure 1:
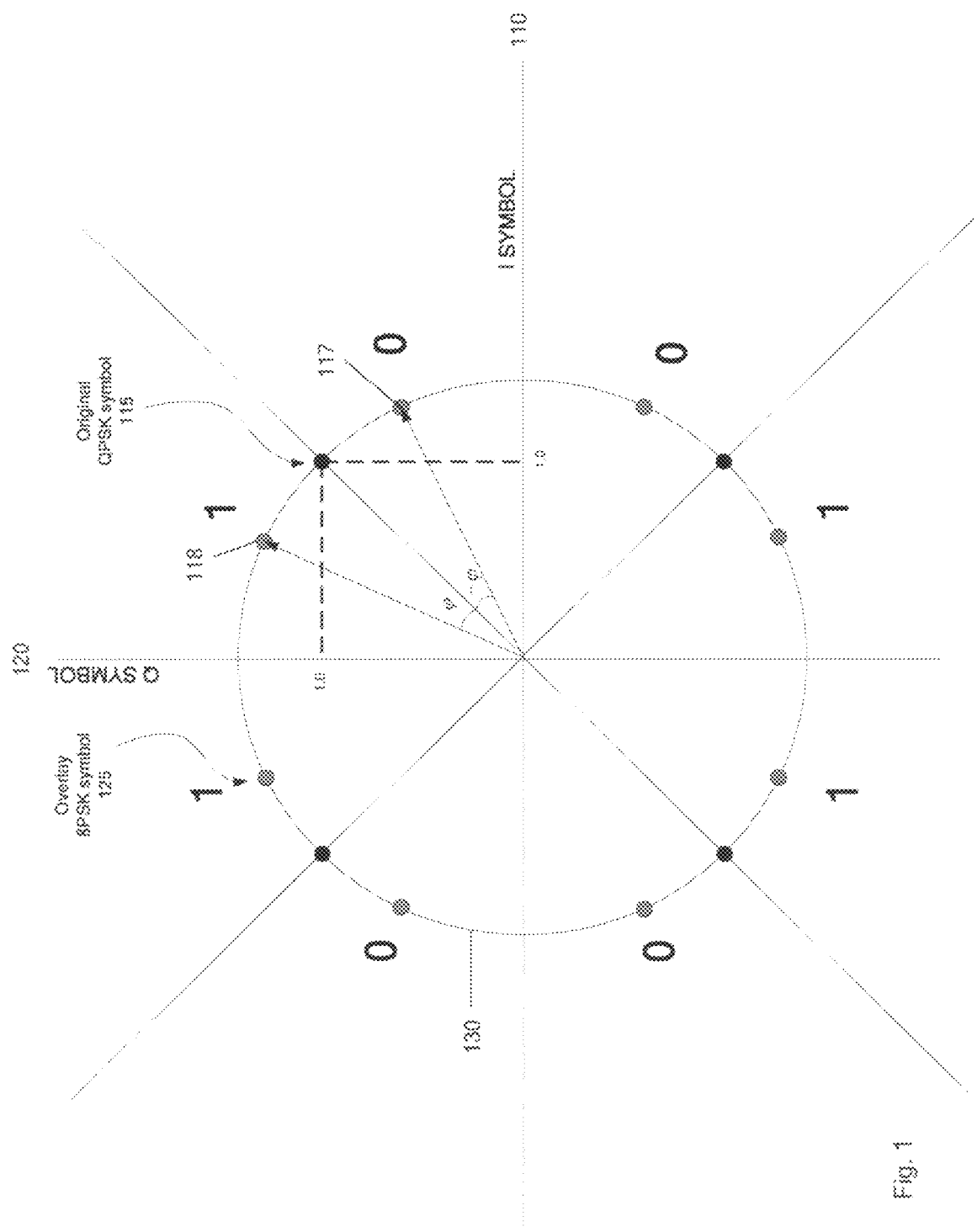
FIG. 1 illustrates an exemplary angular offset over QPSK hierarchical modulation scheme according to an exemplary embodiment of the present invention.

As noted, this technique is illustrated in FIG. 1. FIG. 1 illustrates an exemplary mapping of overlay data onto a legacy QPSK symbol to form a new 8PSK-type constellation. In FIG. 1 unit circle 130 is depicted, with real axis 110 and imaginary axis 120. With reference to FIG. 1, the original (first modulation layer) QPSK symbols are shown in black, at co-ordinates (1,1), (1,−1), (−1,−1) and (−1,1) (i.e., at angles that are multiples of 45 degrees along the unit circle), in each of quadrants I, II, III and IV, respectively. Imposing a second layer of modulation on these legacy symbols transforms each of these QPSK symbols to one of two possible overlay 8PSK symbols 125 (also 117 and 118), shown as the two red points at an angle +/−φ from each original QPSK symbol 115, making a total of eight possible overlay 8PSK symbols. Thus, for example, rotating a QPSK symbol by an additional angle φ can encode an overlay 1, and rotating the same QPSK symbol by an additional angle −φ can encode an overlay 0, as is shown in quadrants I and III. Alternatively, an overlay 0 and 1 can be mapped to the reverse phase shifts, where rotating a QPSK symbol by an additional angle φ can encode an overlay 0, and rotating the same QPSK symbol by an additional angle −φ can encode an overlay 1, as shown in quadrants II and IV.

In FIG. 1, the known Gray coding scheme is utilised. Thus, in quadrants I and III an overlay 1 adds an angle φ to the original QPSK symbol, and an overlay 0 subtracts the angle φ from the original QPSK symbol, and in quadrants II and IV an overlay 0 adds the angle φ and an overlay 1 subtracts the angle φ (a positive rotation being a counterclockwise rotation, as per the standard convention). This is done to improve accuracy, so that if an overlay 1 bit from a neighboring quadrant spills over into the adjacent one, it will still be read as a 1, so all pie slices with overlay 1 are set adjacent to each other, and all pie slices with overlay 0 are set adjacent to each other. In exemplary embodiments of the present invention such a Gray coding scheme can be used, and in alternate exemplary embodiments, it can, if so desired, not be used. In general a Gray coding scheme reduces the error in the overlay bit to one-half what it otherwise would be without the adjacencies.

Thus, for example, with respect to FIG. 1, the original legacy symbol 115 in quadrant I can be transformed to either of two 8PSK overlay symbols 117 and 118, where 117 is sent if the overlay bit is a 0, and 118 is sent if the overlay bit is a 1.

In exemplary embodiments of the present invention, for overlaying information onto QPSK symbols to generate a pseudo 8PSK coding scheme, the angle φ can be set to any value from 0 to 22.5 degrees. With φ greater than 22.5 degrees there could begin to be overlap between received 8PSK symbols (due to the fact that most real channels can have random phase distortions), which is not desired. In alternate exemplary embodiments, if such overlap is not a concern, such as in channels with very low noise or a known predictable (non-random) noise signature that can be reliably removed, φ can have any reasonable range, such as 0 to 40 degrees, and still avoid overlap.

Since the new 8PSK type overlay modulated symbols remain in their original quadrant, the information from the original legacy QPSK symbols is preserved. However, under an overlay modulation scheme, while the legacy decoders expect a standard QPSK signal, what they actually see is the random angular offset of the overlay modulation as an unnatural noise enhancement. Under low SNR conditions, the angular offsets can get lost in the noise, but stronger signals will see an unfair bias to the internal error calculations of the legacy decoder. This unfair bias can hurt performance and synchronization by allowing adaptive algorithms, such as, for example, equalizers, digital gain control, and carrier recovery, to process the invalid error signal. If the legacy decoder synchronization is relied on for retrieval of the overlay data as well, both services can suffer in performance.

A second degradation can also be seen in the performance of the legacy service by allowing the overlay modulated signal to pass through to the Forward Error Correction stage. To address this problem, exemplary embodiments of the present invention seek, for example, to remove the angular offset from the signal prior to inputting a received symbol to Synchronization and Forward Error Correction stages of a legacy decoder.

To properly remove the offset created by the overlay modulation, a decoder would have to know exactly what was transmitted, which is not possible. Instead, in exemplary embodiments of the present invention, a decoder can make a rough guess by hard-slicing the overlay modulated signal to the appropriate pie slice within the received quadrant, thereby indicating in which direction the overlay offset was added. For example, with reference to FIG. 1 and the overlay modulation scheme shown therein, assuming the original QPSK symbol was original QPSK symbol 115 with an overlay angular change, and it is necessary to determine whether the overlay symbol that was sent was 118, with an angular increase of $\phi$, or 117, with an angular decrease of $\phi$. By slicing quadrant I by the line I=Q, i.e., the line running form the origin through original QPSK symbol 115, a good rough guess is that if the received overlay symbol is to the right of that line it has a 0 overlay bit, and if the received overlay symbol is to the left of that line, it has a 1 overlay bit. With knowledge of the angle used in transmitting the overlay signal, any received overlay symbol can then be de-rotated by the same amount, thus removing the effect of the overlay modulation. Any error vector calculated from such a de-rotated symbol will thus more accurately represent the true error of the received symbol.

Figure 2:
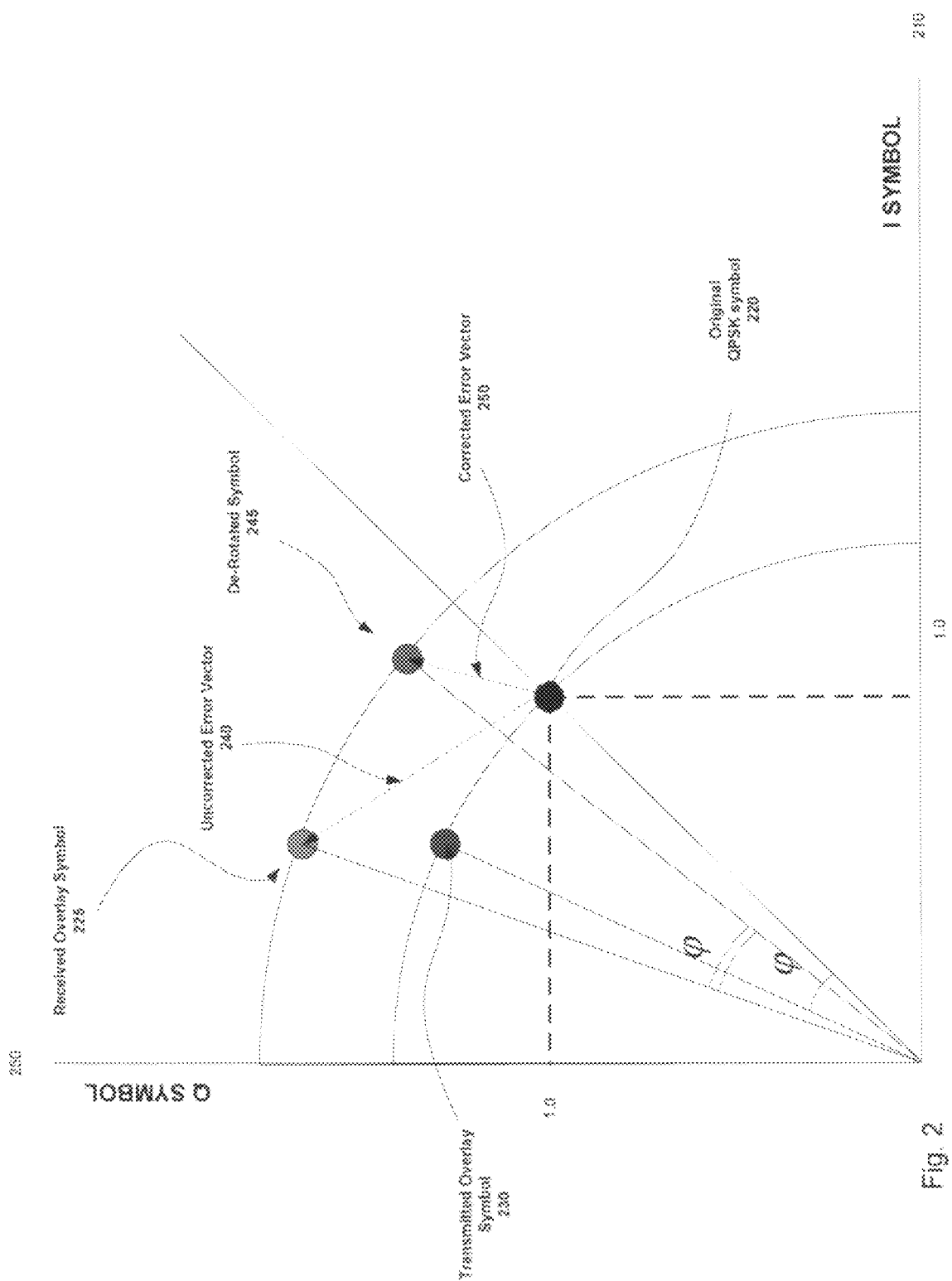
FIG. 2 illustrates overlay offset compensation according to an exemplary embodiment of the present invention.

FIG. 2 illustrates such de-rotation of a received symbol according to an exemplary embodiment of the present invention. With reference thereto, quadrant I of the I,Q plot of FIG. 1 is shown, with I Symbol axis 210 and Q Symbol axis 250. An exemplary Original QPSK Symbol 220 is shown in black, and the transmitted version of this symbol after overlay modulation—by adding an angle $\phi$ to its phase—being Transmitted Overlay Symbol 230, is shown in blue (the angle $\phi$ between Original QPSK Symbol 220 and Transmitted Overlay Symbol 230 is shown with one angle sign, closest to the origin of the depicted I,Q plot). The actually received version of this symbol, Received Overlay Symbol 225, is shown in red, and has a larger amplitude than, and a phase distortion relative to, Transmitted Overlay Symbol 230, and thus it is no longer on the unit circle (these changes to amplitude and phase of the transmitted symbol being introduced by noise in the channel). After subtracting the known angle $\phi$ from the phase of Received Overlay Symbol 225, a de-rotated symbol results, being De-Rotated Symbol 245, shown in green (the angle $\phi$ between Received Overlay Symbol 225 and De-Rotated Symbol 245 is shown with two angle signs). Thus, in exemplary embodiments of the present invention, the error vector seen by the decoder after de-rotation, Corrected Error Vector 250, is significantly smaller than that of Uncorrected Error Vector 240, which is the difference between Original QPSK Symbol 220 and Received Overlay Symbol 225 and.

It is noted with reference to FIG. 2 that Corrected Error Vector 250 should match the error with respect to the transmitted signal (i.e., the error between Received Overlay Symbol 225 and Transmitted Overlay Symbol 230, not shown in FIG. 2, but easily discernable). Of course this method is not absolute, and symbols received outside the quadrant that they were actually transmitted in will be de-rotated in the wrong direction. While such improperly rotated symbols will result in a more favorable than expected error vector, this should have negligible effects compared to the much larger percentage of symbols that are received within their originally transmitted quadrant and that are properly de-rotated.

It is noted that the actual performance gain realized due to overlay offset compensation is dependent upon the actual algorithms that take advantage of the compensation. Thus, some algorithms may see a great improvement, while others may see no improvement at all. In exemplary embodiments of the present invention the simplest solution to compensating for overlay modulation is provided without needing to modify any proven algorithms within legacy demodulator designs. The methods of exemplary embodiments of the present invention thus allow for essentially any offset angle used in an overlay modulation scheme to have minimal effect on signal acquisition and performance.

While the present invention has been described with reference to certain exemplary embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed:

1. A method of compensating for the effects of hierarchical modulation on legacy decoding, comprising:
   receiving an I,Q symbol that has been further modulated by an overlay phase shift;
   detecting the direction of the overlay phase shift;
   de-rotating the symbol by a defined angle corresponding to the overlay phase shift and said direction; and
   passing the symbol to legacy synchronization and forward error correction decoding stages after said de-rotating,
   wherein said detecting the direction of the overlay phase shift includes hard slicing the overlay phase shift modulated signal to make a rough guess as to the appropriate slice (octant) within a given quadrant.

2. The method of claim 1, wherein the I,Q symbols are the result of a first QPSK modulation, and an overlay layer of modulation comprises applying a programmable angular offset to said QPSK symbols.

3. The method of claim 2, wherein the result of overlay modulating the QPSK symbols is a constellation similar to 8PSK.

4. The method of claim 2, wherein the programmable angular offset is between 0 and 22.5 degrees.

5. The method of claim 2, wherein the overlay modulation scheme places 8PSK symbols with an overlay 1 bit adjacent to symbols with an overlay 1 bit in an adjacent quadrant and symbols with an overlay 0 bit adjacent to symbols with an overlay 0 bit in adjacent quadrant.

6. A receiver, comprising:
a receiving stage to receive I,Q symbols that have been further modulated with an overlay phase shift;
an overlay demodulation stage to detect a direction of the overlay phase shift
a de-rotation stage to remove a defined angular offset from the received I,Q symbols;
a synchronization stage; and
a forward error correction stage,
wherein each received I,Q symbol is overlay demodulated and de-rotated prior to being input to the synchronization and forward error correction stages,
wherein said demodulation stage includes hard slicing the overlay phase shift modulated signal to make a rough guess as to the appropriate slice (octant) within a given quadrant.

7. The receiver of claim 6, wherein the defined angular offset is between 0 and 22.5 degrees.

8. The receiver of claim 6, wherein the overlay phase shift places 8PSK symbols with an overlay 1 bit adjacent to symbols with an overlay 1 bit in an adjacent quadrant and symbols with an overlay 0 bit adjacent to symbols with an overlay 0 bit in an adjacent quadrant.

9. A program storage device readable by a processing unit, tangibly embodying a program of instructions executable by the processing unit to implement a method of compensating for the effects of hierarchical modulation on legacy decoding, said method comprising:

receiving an I,Q symbol that has been further modulated by an overlay phase shift;
detecting the direction of the overlay phase shift;
de-rotating the symbol by a defined angle corresponding to the overlay phase shift and said direction; and
passing the symbol to legacy synchronization and forward error correction decoding stages after said de-rotating,
wherein said detecting the direction of the overlay phase shift includes hard slicing the overlay phase shift modulated signal to make a rough guess as to the appropriate slice (octant) within a given quadrant.

10. The program storage device of claim 9, wherein in said method the I,Q symbols are the result of a first QPSK modulation, and an overlay layer of modulation comprises applying a programmable angular offset to said QPSK symbols.

11. The program storage device of claim 10, wherein in said method the result of overlay modulating the QPSK symbols is a constellation similar to 8PSK.

12. The program storage device of claim 10, wherein in said method the programmable angular offset is between 0 and 22.5 degrees.

13. The program storage device of claim 10, wherein in said method the overlay modulation scheme places 8PSK symbols with an overlay 1 bit adjacent to symbols with an overlay 1 bit in an adjacent quadrant and symbols with an overlay 0 bit adjacent to symbols with an overlay 0 bit in an adjacent quadrant.

\* \* \* \* \*